United States Patent
Mertens et al.

(10) Patent No.: US 7,628,516 B2
(45) Date of Patent: Dec. 8, 2009

(54) HEADLIGHT ADJUSTING ASSEMBLY FOR GROUPS OF ADJUSTABLE ILLUMINATING UNITS

(75) Inventors: Jens Mertens, Esslingen (DE); Otto Muller, Gruibingen (DE); Frank Tebbe, Ertingen (DE)

(73) Assignee: odelo GmbH, Schwaikheim (DE)

( * ) Notice: Subject to any disclaimer, the term of this patent is extended or adjusted under 35 U.S.C. 154(b) by 145 days.

(21) Appl. No.: 11/696,182

(22) Filed: Apr. 3, 2007

(65) Prior Publication Data

US 2007/0274088 A1    Nov. 29, 2007

(30) Foreign Application Priority Data

Apr. 5, 2006    (DE) .................. 10 2006 016 378

(51) Int. Cl.
*B60Q 1/06* (2006.01)
(52) U.S. Cl. .................. 362/420; 362/525; 362/543; 362/530; 362/544
(58) Field of Classification Search .................. 362/420, 362/512, 525, 543, 530
See application file for complete search history.

(56) References Cited

U.S. PATENT DOCUMENTS

| | | | |
|---|---|---|---|
| 4,539,627 A * | 9/1985 | Ogishima | 362/476 |
| 5,567,032 A | 10/1996 | Heizmann | |
| 6,953,274 B2 * | 10/2005 | Rice | 362/526 |
| 7,226,185 B2 * | 6/2007 | Dolgin et al. | 362/239 |
| 2003/0201411 A1 * | 10/2003 | Koren | 250/584 |
| 2005/0201090 A1 * | 9/2005 | Knight | 362/230 |
| 2008/0198617 A1 * | 8/2008 | Schwab et al. | 362/545 |

FOREIGN PATENT DOCUMENTS

| | | |
|---|---|---|
| DE | 165 5 731 | 3/1971 |
| DE | 102 004 020 493 | 11/2005 |
| EP | 1 077 158 | 2/2001 |

* cited by examiner

*Primary Examiner*—Ali Alavi
*Assistant Examiner*—Evan Dzierzynski
(74) *Attorney, Agent, or Firm*—Reising Ethington P.C.

(57) ABSTRACT

The invention relates to a headlamp adjusting device with lamp units that can be adjusted in groups. To this end, each lamp unit is mounted individually directly or indirectly in the headlamp housing by means of one respective joint; and it is swivelably mounted in a first feed mechanism. The headlamp adjusting device comprises a second feed mechanism. The second feed mechanism guides the first feed mechanism. The orientation of the feed motion of the first feed mechanism and the orientation of the feed motion of the second feed mechanism enclose an angle, which is not equal to an integral multiple of Pi.

With the present invention a space-saving headlamp adjusting device for adjusting the lamp units in two directions of adjustment is developed.

2 Claims, 4 Drawing Sheets

HEADLIGHT ADJUSTING ASSEMBLY FOR GROUPS OF ADJUSTABLE ILLUMINATING UNITS

The invention relates to a headlamp adjusting device with lamp units that can be adjusted in groups.

In motor vehicle headlamps—for example, in headlamps with luminescent diodes as the light sources—, the low beam, the high beam, the daytime driving light, etc. are usually generated by means of several lamp units. A lamp unit comprises a light module or a reflector module or a group of light modules and/or reflector modules. These lamp units are supposed to be adjustable in order to adapt the illumination of the roadway to the driving condition. If, for example, the vehicle is cornering, it is supposed to be possible to swivel the lamp units into the direction of the curve. If, for example, the vehicle is loaded or unloaded, it is supposed to be possible to adjust the lighting range of the headlamps to the loading conditions.

Therefore, the present invention is based on the problem of developing a space-saving headlamp adjusting device for adjusting the lamp units in two directions of adjustment.

This problem is solved with the features of the main claim. To this end, each lamp unit is mounted individually directly or indirectly in the headlamp housing by means of one respective joint; and it is swivelably mounted in a first feed mechanism. The headlamp adjusting device comprises a second feed mechanism. The second feed mechanism guides the first feed mechanism. The orientation of the feed motion of the first feed mechanism and the orientation of the feed motion of the second feed mechanism enclose an angle, which is not equal to an integral multiple of Pi.

Further details of the invention are disclosed in the dependent claims and the following description of the embodiments, which are depicted as schematic drawings.

Figure 1:
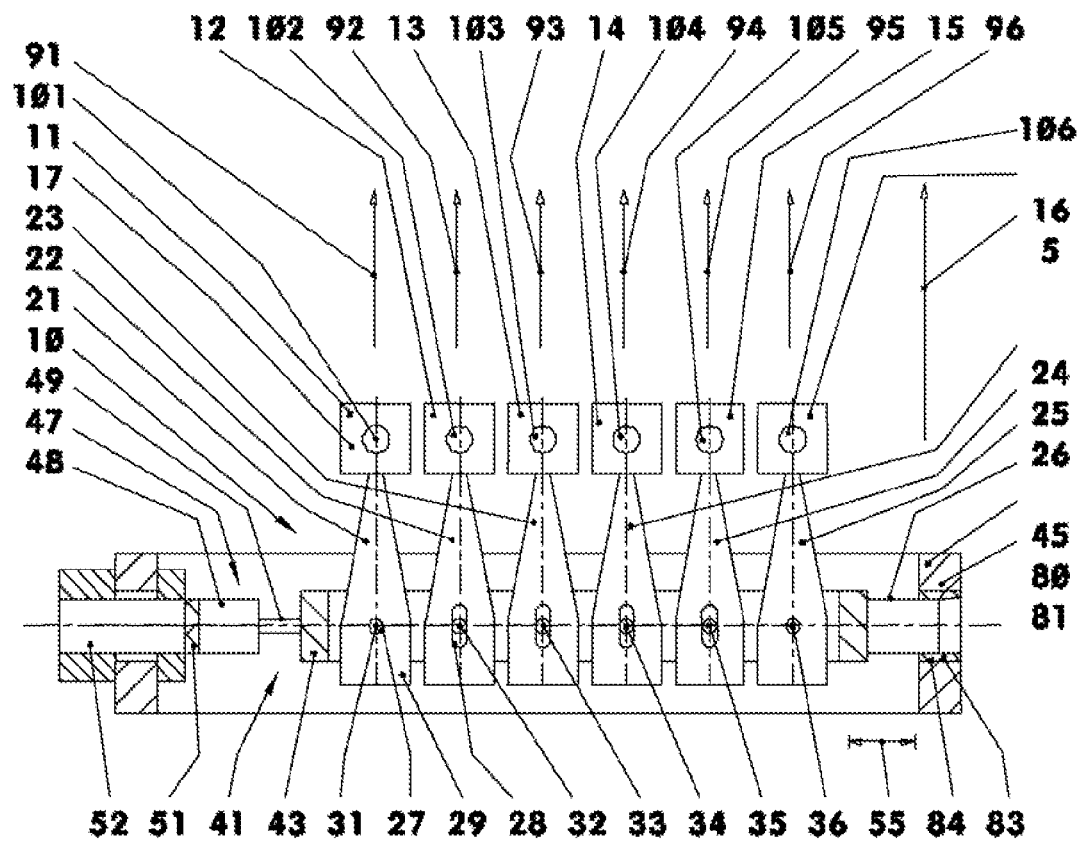

FIG. 1: horizontal sectional view of a headlamp adjusting device.

Figure 2:
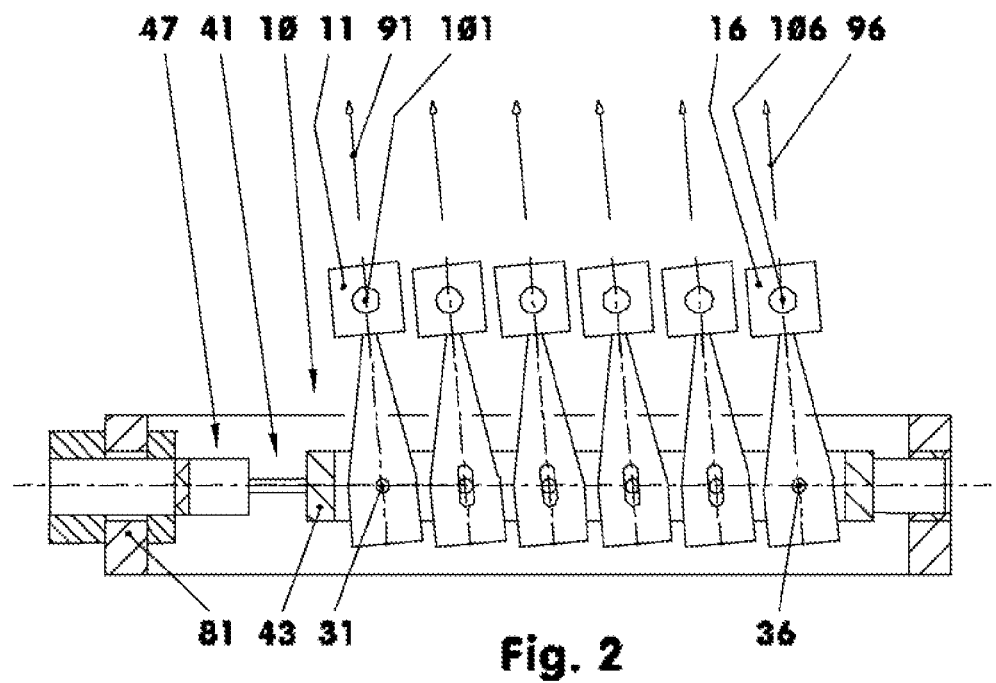

FIG. 2: FIG. 1 in a swivelled position.

Figure 3:
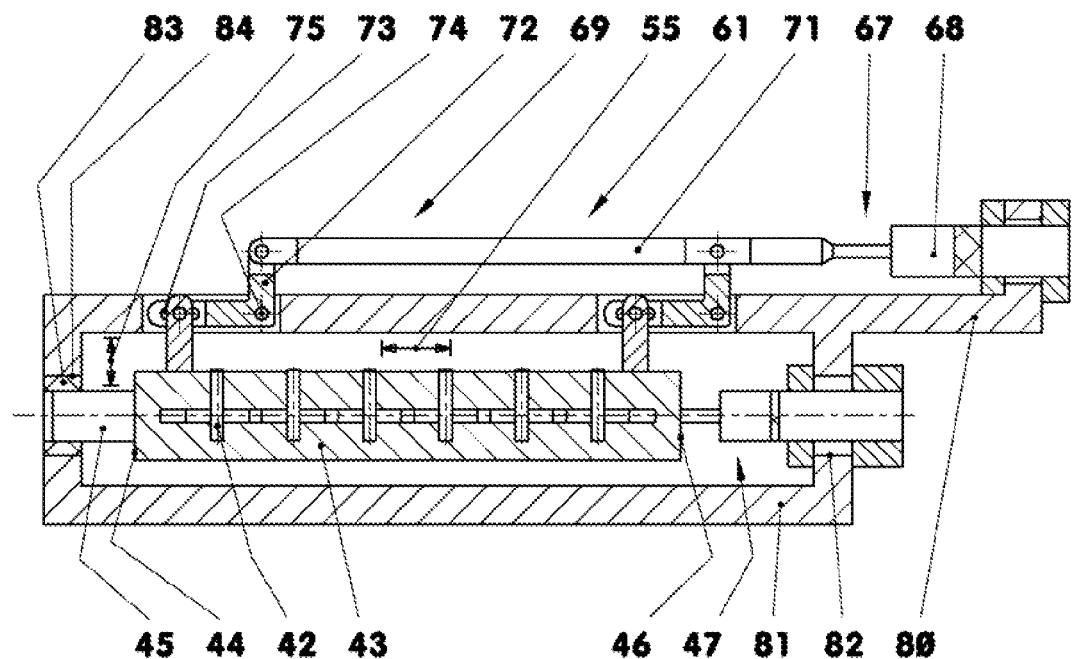

FIG. 3: cross sectional view of the headlamp adjusting device from FIG. 1.

Figures 4, 5:
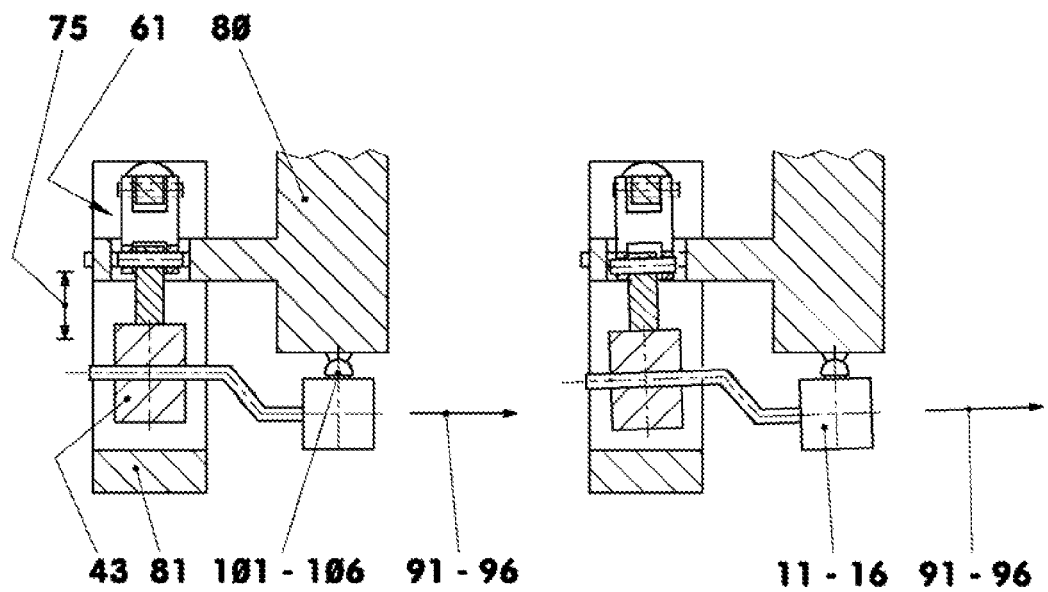

FIG. 4: longitudinal sectional view from FIG. 1.

FIG. 5: FIG. 4 with adjusted lighting range.

Figure 6:
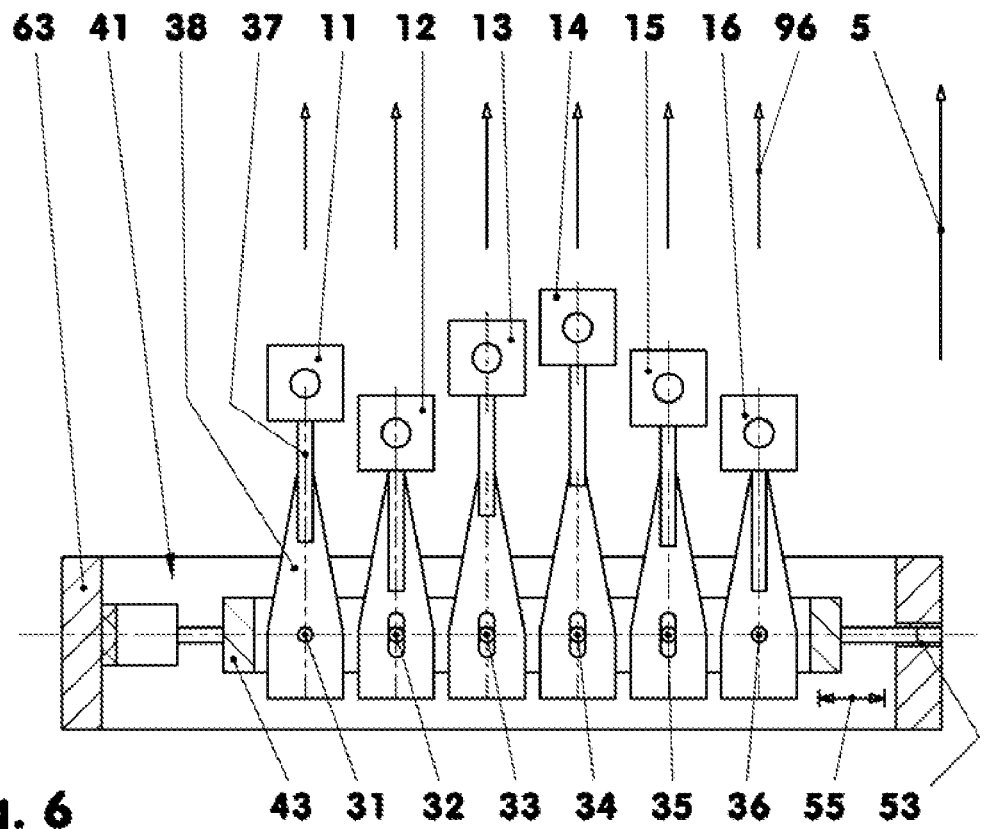

FIG. 6: adjusting device with lamp units offset from each other in the direction of travel.

Figure 7:
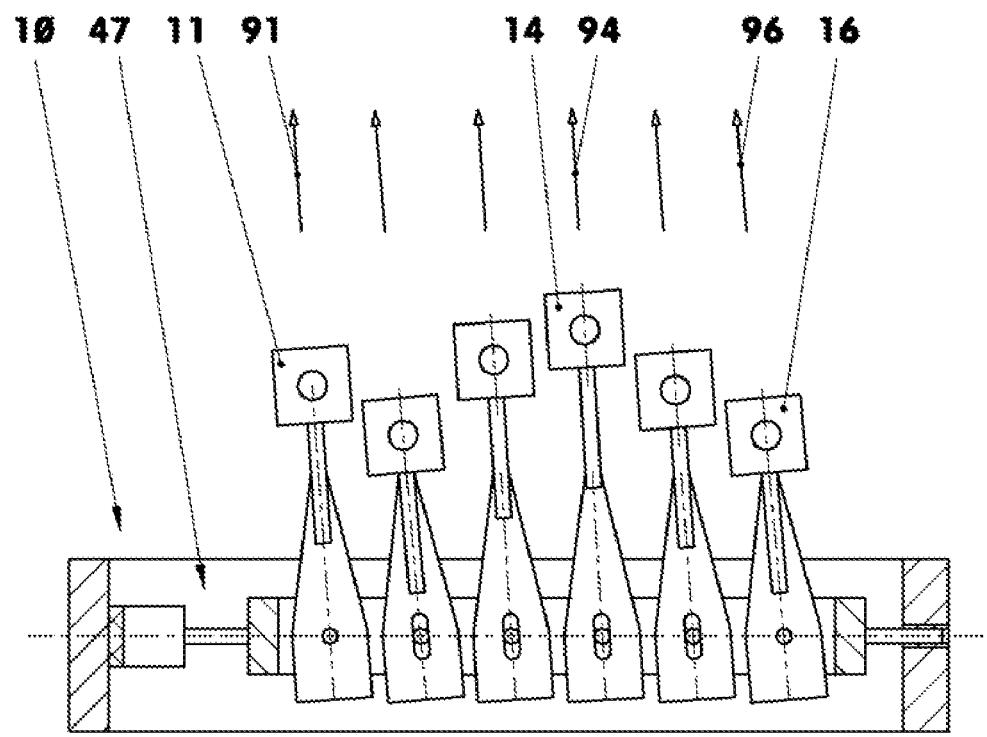

FIG. 7: FIG. 6 is a swivelled position.

Figure 8:
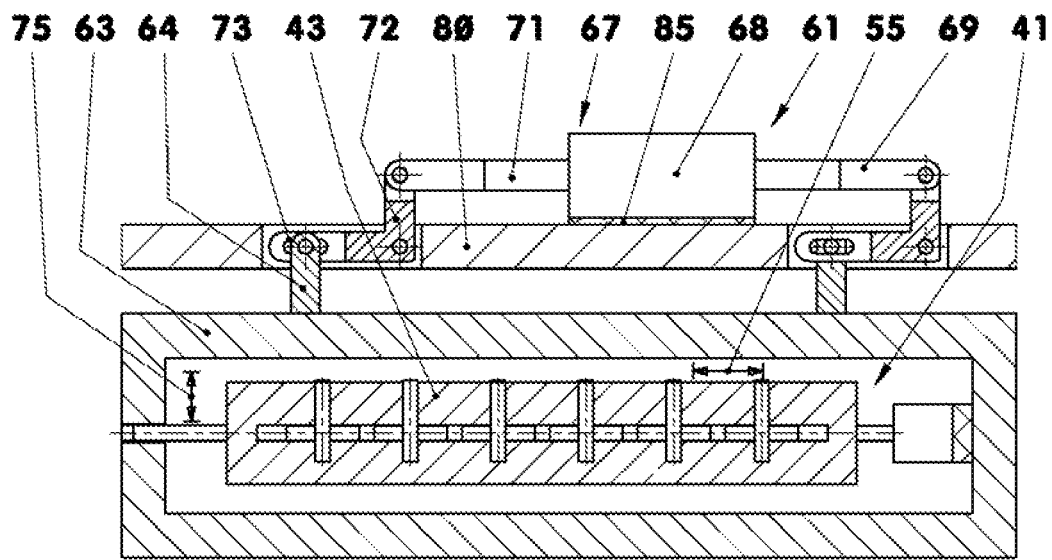

FIG. 8: cross sectional view of the headlamp adjusting device from FIG. 6.

Figure 9:
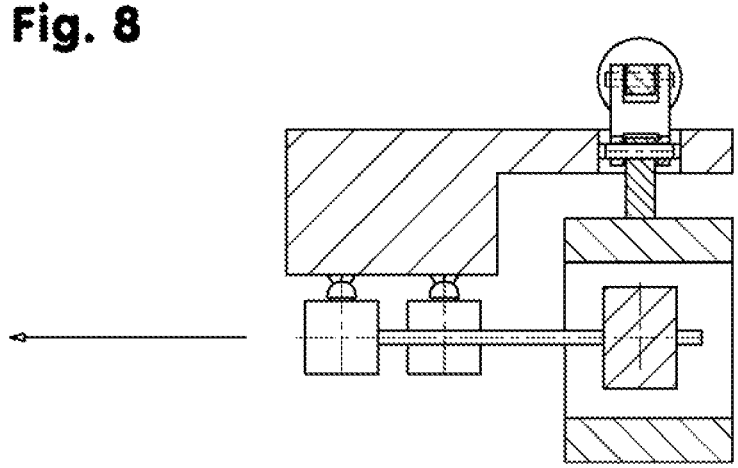

FIG. 9: longitudinal sectional view from FIG. 6.

Figure 10:
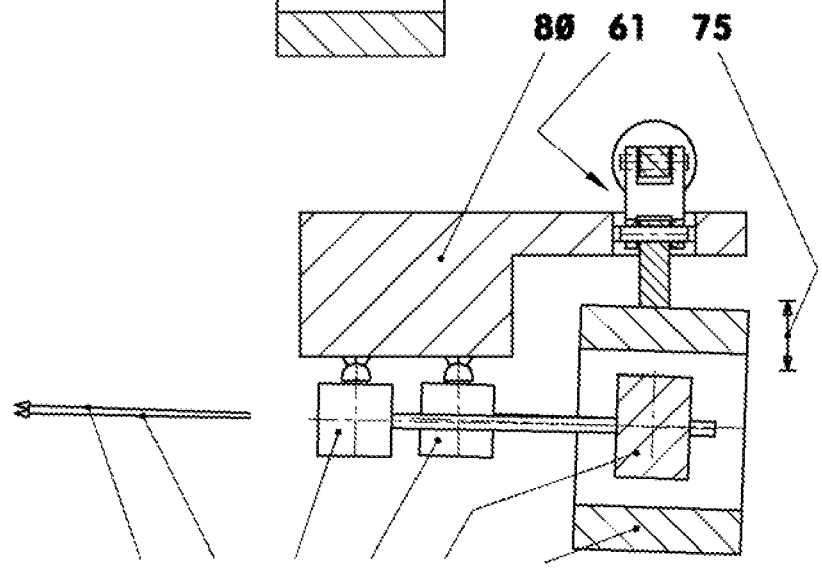

FIG. 10: FIG. 9 with adjusted lighting range.

FIGS. 1 to 5 depict a headlamp adjusting device (10) of, for example, a left front headlamp of a motor vehicle. FIGS. 1 and 2 are sectional views of the headlamp adjusting device (10), where the intersecting plane is, for example, a horizontal plane. FIG. 1 depicts the headlamp adjusting device (10) in a middle position, for example, when the vehicle is traveling in a straight line. FIG. 2 depicts the headlamp adjusting device (10), for example, with the lamp units (11-16), swung to the left. FIG. 3 is a cross sectional view of the headlamp adjusting device (10) with an intersecting plane normal to the direction of travel (5) of the vehicle. FIGS. 5 and 6 are longitudinal sectional views of the headlamp adjusting device (10). In this respect, FIG. 5 depicts the lamp units (11-16) in a middle position, for example, at an average loading of the vehicle. FIG. 6 depicts the lamp units (11-16) with an increased lighting range, e.g., for a motor vehicle, which is loaded in a front heavy manner. In this case the lamp units (11-16) are depicted as swivelled in the clockwise direction.

The headlamp, which is not shown in detail in FIGS. 1 to 5, comprises a headlamp housing (80), in which there is the headlamp adjusting device (10) comprising, for example, six lamp units (11-16), which are arranged side by side, and comprising two feed mechanisms (41, 61). The lamp units (11-16) are aimed towards the front in the direction of travel (5) of the motor vehicle. The headlamp adjusting mechanism (10) or individual ones of their components may be disposed indirectly in the headlamp housing (80) or may be connected to said housing directly, for example, by means of adapter components.

In this example each lamp unit (11-16) comprises a light module (17) and a swivel lever (21-26), which is fastened to the light module (17).

The light module (17) has, for example, a frame, in which one or more light sources, optical lenses, cooling elements, etc. are positioned in relation to each other. Instead of a light module (17), the individual lamp units (11-16) may also comprise a reflector module, in which the light, emitted by the light source, is deflected, for example, at a reflector. In a lamp unit (11-16) a plurality of light modules (17) and/or reflector modules may be mounted stationarily in relation to each other, for example, as one unit.

In this embodiment the individual lamp unit (11-16) is mounted in a hanging manner in the headlamp housing (80) by means of a joint (101-106). The joint (101-106) is, for example, a ball joint (101-106) with three degrees of freedom of swivel. Instead of a ball joint (101-106), a joint or a combination of joints with two degrees of freedom of swivel may also be used. Then such a joint permits, for example, a swivel motion with a vertical swivel axis, which is oriented, for example, normal to the roadway, and with a horizontal swivel axis, where the latter lies, for example, transversely to the direction of travel (5). The individual lamp unit (11-16) may also be mounted on a joint (101-106) in a stationary manner directly or indirectly in the headlamp housing (80).

The swivel levers (21-26) are fastened, for example, to the rear side of the lamp units (11-16). In the drawing shown in FIG. 1, they project beyond the lamp units (11-16) radially to the joints (101-106). In the first feed mechanism (41) they are mounted in a swivelable manner, for example, in swivel pins (42). The swivel pins (42) and the swivel levers (21-26) form the joints (31-36) with a degree of freedom of swivel. This degree of freedom of swivel lies, for example, in a horizontal plane, e.g., parallel to the roadway. In order to accommodate the swivel pins (42), the two external swivel levers (21, 26) have, for example, cylindrical breakthroughs (27); the internal swivel levers (22-25) have oblong holes (28), which are oriented in the longitudinal direction of the swivel levers (22-25). Even the external swivel levers (21, 26) may exhibit oblong holes (28). All swivel levers (21-26) are, for example, bent off so that the ends (29), which are guided in the feed mechanism (41) and belong to the swivel levers (21-26), and the ball joints (101-106) span a common, for example, horizontal plane. The individual swivel lever (21-26) has, for example, a rectangular cross section, whose width increases in the direction of the feed mechanism (41).

In the first feed mechanism (41) the swivel levers (21-26) are mounted in a frame (43) having, for example, a rectangular, flat cross section. In this embodiment the wide cross section of the ends (29) of the swivel levers (21-26) prevents the lamp units (11-16) from tipping over. In the drawing shown in FIG. 1, the frame (43) is arranged transversely to the swivel levers (21-26).

In this embodiment the one face side (44) of the frame (43) exhibits a guide pin (45); on the other face side (46) a drive unit (47) acts on the frame (43). In the drawing shown in FIG. 1, both the guide pin (45) and the drive unit (47) (both are parts of the feed mechanism (41)) are oriented normal to the swivel levers (21-26).

In this example, the drive unit (47) comprises a drive motor (48) and a transmission element (49). The drive motor (48) is, for example, a linear stepping motor, a spindle motor, a rotatory motor, etc. The transmission element (49) may be a pressure or tension rod, a spindle, a coupled gear, a wheel gear, etc. The transmission element (49) is connected, for example, rigidly to the frame (43) by means of an elastically deformable element or by means of a joint.

When the drive unit (47) is operating, the frame (43) is displaced maximally by the feed motion (55) of the feed mechanism (41). Therefore, the feed motion (55) is the distance that the feed mechanism (41) travels, for example, between two end stops. In this example, said feed motion is oriented in the horizontal direction, transversely to the direction of travel (5).

The first feed mechanism (41) is mounted in a mounting frame (81) by means of the guide pin (45) and the drive unit (47). Therefore, the drive motor (48) is connected to a mounting bolt (52), sitting in the frame breakthrough (82), for example, by means of an elastically deformable intermediate element (51). The guide pin (45) is mounted, for example, in an elastically deformable sleeve (83) in the mounting frame (81) in a breakthrough (84). In this embodiment the mounting frame (81) is a part of the headlamp housing (80).

In this example the drive unit (67) of the second feed mechanism (61) sits on the mounting frame (81). Said drive unit comprises a drive motor (68), which is connected to the internal frame (43) by means of a gear (69). The drive motor (68) is constructed, for example, in a manner similar to the drive motor (48) of the first feed mechanism (41). The fastening of the drive motor (60) on the mounting frame (81) is constructed, for example, exactly as the fastening of the drive motor (48) on the mounting frame (81).

The gear (69) is, for example, a coupled gear (69), whose motion link is the internal frame (43). The drive motor (68) acts on a horizontal rod (71), which is connected in an articulated manner to two coupling elements (72). The coupling elements (72) have, for example, horizontal oblong holes (73), in which the frame (43) is positioned, for example, so as to hang. In addition, the coupling elements (72) are mounted in the mounting frame (81) by means of one respective joint (74). Therefore, the direction of motion of the frame (43) is at least approximately normal to the longitudinal direction of the swivel levers (21-26). The coupling elements (72) may be deformed elastically, for example, in the direction of their minimum moment of resistance.

When the drive unit (67) is operating, the frame (43) is displaced maximally by the feed motion (75) of the second feed mechanism (61). Therefore, the feed motion (75) is the distance that the second feed mechanism (61) displaces the frame (43), for example, between the two end stops. In this example, said feed motion is oriented in the vertical direction.

In the central position, depicted in FIG. 1, all of the lamp units (11-16) are standing, for example, parallel to each other. Their directions of light propagation (91-96) are, for example, parallel to each other. For each lamp unit (11-16) the feed motion (55) of the feed mechanism (41) lies, for example, on a tangent line to a circle about the respective joint (101-106).

If the motor vehicle turns, for example, to the left, the lamp units (11-16) are swung in the direction of the curve, thus counterclockwise to the left in order to illuminate the curve (cf. FIG. 2). In FIG. 2 the swivel angle of the lamp units (11-16) is exaggerated for the sake of a better understanding. Said swivel angle is, for example, less than or equal to 2 degrees in a motor vehicle.

In order to adjust the lamp units (11-16), for example, when the vehicle turns to the left, the first feed mechanism (41) is actuated. The drive motor (48) extends the spindle (49) and displaces the internal frame (43) in the direction of the feed motion, for example, in the direction of the right side of the vehicle (cf. FIG. 2). Therefore, the frame (43) is guided, for example, by means of the guide pin (45) in the passage bore (84), while simultaneously deforming the sleeve (83). The swivel pins (42) guide the swivel levers (21-26), which in turn swivel the lamp units (11-16) about the joints (101-106). In the swivelled position of the lamp units (11-16), depicted in FIG. 2, the lamp units (11-16) are standing parallel to each other. Even the directions of light propagation (91-96) are, for example, parallel to each other.

If the motor vehicle travels again in a straight line, the spindle (49) is retracted again. The frame (43) returns again into its central position. In the case of a right turn, the spindle (49) is driven out, for example, of its central position and pulls the frame (43) in the direction of the left side of the vehicle.

FIG. 4 is a side view of the headlamp adjusting device (10) from FIG. 1. The lamp units (11-16) are standing in a central position. The directions of light propagation (91-96) of the individual lamp units (101-106) are, for example, parallel to each other. The feed motion (75) of the feed mechanism (61) for each lamp unit (11-16) lies on a tangent line to a circle about the respective joint (101-106).

In order to increase the lighting range of the lamp units (11-16), they are swung, for example, from the central position into the position depicted in FIG. 5. To this end, the drive unit (67) of the second feed mechanism (61) is actuated. In the drawing shown in FIG. 3, the drive motor (68) pushes the rod (71) to the left. In so doing, the coupling elements (72) are swung counterclockwise and push the frame (43) downwards. If necessary, the flexible elements and the elastically deformable elements (51, 83) are deformed; and/or an angular or linear displacement is compensated for with the play in the joints (72, 73; 74). When the second feed mechanism (61) is moved, the first feed mechanism (41) is guided along the feed motion (75). The swivel levers (21-26) are also carried along and swivel the lamp units (11-16) clockwise about the joints (101-106) (cf. FIGS. 4 and 5). In this example the swivel angle of the lamp units (11-16) is, for example, 2 degrees. The directions of light propagation (91-96) of the individual lamp units (11-16) are also parallel to each other in the swivelled state.

In order to adjust the lighting range of the lamp units (11-16) back again into the starting position or in order to decrease the lighting range, the feed mechanism (61) is moved into the opposite direction.

Each of the two feed mechanisms (41, 61) may comprise a position and/or angle measuring device. Said position and/or angle measuring devices may be integrated in the drive units (47, 67), may be fastened to the lamp module (11-16), etc. If desired, the feed mechanisms (41, 61) may also comprise locking mechanisms, which lock, for example, the frame (41) into an operating position.

The feed mechanism (61) may guide the first feed mechanism (41) on a curved path. The flexible elements and the elastically deformable elements are then deformed, for example, just slightly.

It is also conceivable to use a drive motor for both feed mechanisms (41, 61). For example, said drive motor may then operate, for example, alternatingly the first (41) or the second feed mechanism (61) by means of two couplings.

In the described embodiment the feed motions (55, 75) are oriented at least approximately normal to each other. However, the orientations of the two distances may also enclose an imaginary angle, which is not equal to 90 degrees. However, the orientations of the feed motions (55, 75) of the two feed mechanisms (41, 61) are not identical. The feed mechanisms (41, 61) also do not act in directions that are opposite each other. Therefore, the orientations of the feed motions (55, 75) may enclose an angle that is not equal to an integral multiple of Pi.

FIGS. 6 to 10 depict a headlamp adjusting device (10), in which the lamp units (11-16) are offset relative to each other in the direction of travel (5). In this embodiment the joints (101-106) are arranged in a common, for example horizontal plane. The lamp unit (16), which lies outwardly on the right hand side in the direction of travel (5), and the second lamp unit (12) from the left have the same position as the corresponding lamp units (12, 16), which are depicted in FIG. 1. In this example, the third lamp unit (14) from the right projects the furthest into the direction of travel (5). The distance between the joints (104, 34) is, for example, 50% greater than the distance between the joints (106, 36) of the externally located lamp unit (16).

The swivel levers (21-26) are constructed as two parts. They comprise a rod (37), which is guided in a slidable manner in a sleeve (38). For example, the rod (37) has a square outside cross section; and the sleeve (38) has a square inside cross section. Thus, the two parts (37, 38) form a pushing joint and cannot be rotated relative to each other. In this embodiment the swivel levers (21-26) are constructed in a manner that they are not bent off.

The frame (43) and the drive unit (47) of the first feed mechanism (41) are constructed, for example, in the same manner as described in connection with the FIGS. 1 to 5. The drive unit (47) and the guide pin (45) mount the feed mechanism (41) in an external frame (63). The guide pin (45) is mounted, for example, in a friction bearing (53) in the external frame (63).

The external frame (63) hangs with two hooks (64) in oblong holes (73) from the coupling elements (72), which are a part of the drive unit (67) of the feed mechanism (61). The drive unit (67) comprises a drive motor (68). The latter has, for example, a continuous spindle (71), which is connected in an articulated manner to the coupling elements (72). In this embodiment the drive motor (68) sits on an elastically deformable plate (85), which is fastened to the headlamp housing (80). The coupling elements (72) are mounted in an articulated manner in the headlamp housing (80).

When driving in a straight line (cf. FIG. 6), the lamp units (11-16) are oriented parallel to each other. Even the directions of light radiation (91-96) are parallel to each other.

If the vehicle turns, for example, to the left, the frame (43) is swivelled, as described in connection with the first embodiment, to the right by means of the drive unit (47). The lamp units (11-16) are swung counterclockwise (cf. FIG. 7). In so doing, the length of the swivel levers (21-26) is changed, if necessary. Thus, the swivel angle of the individual lamp unit (11-16) is a function of the distance between the joints (101-106, 31-36) of the respective swivel lever (21-26). If the distance between the joints (104, 34) is large, the feed motion (55) of the feed mechanism (41) brings about a small swivel angle of the lamp unit (14). However, the same feed motion (55) causes a large swivel angle of the lamp units (12, 16), where the distance between the joints (102, 32; 106, 36) is small.

The directions of light radiation (91-96) of the swivelled lamp units (11-16) diverge, for example, from each other. Thus, for example, a larger area of the roadway can be illuminated in a curve than when driving in a straight line.

When driving in a straight line, the lamp units (11-16) are reset again into the central position. If the vehicle turns to the right, the lamp units (11-16) are swung into the opposite direction.

In the side view (cf. FIG. 9), the directions of light radiation (91-96) are parallel to each other when the lamp units (11-16) are set for an average lighting range. In order to increase the lighting range, the first feed mechanism (41) is swung about the joints (101-106) by means of the second feed mechanism (61). To this end, the drive motor (68) pushes the rod (71), for example, to the left (cf. FIG. 8). The coupling elements (72) are swivelled counterclockwise and guide the external frame (63) along the feed motion (75), for example, downwardly. Therefore, the lamp units (11-16) swivel clockwise about the joints (101-106). The lighting range is enlarged. The swivel levers (21-26) are elongated or shortened, as desired.

FIG. 10 depicts the lamp units (11-16) in the swivelled position. The directions of light radiation (91-96) diverge. At the same time the respective direction of light radiation (91-96) becomes flatter with respect to the horizontal plane, the greater the distance between the joints (101-106; 31-36) from each other grows. Thus, for example, in a vehicle, wherein the front axle is more heavily loaded than the rear axle, an adequately large area in front of the vehicle can be illuminated.

If the vehicle travels with a normal load, the lamp units (11-16) are set back again into the central position of the lighting range adjustment that is shown in FIG. 9. In a back-heavy vehicle the lamp units (11-16) are moved correspondingly into the opposite direction.

The headlamp adjusting device, described here, may exhibit position and/or angle measuring systems, with which the actual position of the feed mechanisms (41, 61) is monitored. Then the drive motors may be constructed, for example, without position sensing. The feed mechanisms (41, 61) may also comprise locking mechanisms.

The drive motors (48, 68), which are used in the embodiments, are, for example, linear stepping motors, whose necessary displacement position is calculated, for example, on the basis of an actual data acquisition of the vehicle state, such as steering angle, loading, acceleration, etc. The input values for the drive motors (48, 68) may also be determined on the basis of the expected driving conditions.

Combinations of the embodiments, described here, are also conceivable.

Even if there is limited installation space inside the headlamp, the headlamp adjusting device (10) permits an adjustment of a plurality of lamp units (11-16) without the need for each lamp unit (11-16) to have its own feed mechanism (41, 61). Thus, the headlamp adjusting device (10) is designed in a compact and space-saving manner.

LIST OF REFERENCE NUMERALS 5 direction of travel
10 headlamp adjusting device
11-16 lamp units
17 light module
21 swivel lever, external
22-25 swivel lever, internal
26 swivel lever, external
27 breakthroughs in (21, 26)
28 oblong holes in (22-25)
29 ends of (21-26)
31-36 joints
37 rod
38 sleeve
41 first feed mechanism 42 swivel pin
43 frame
44 face side
45 guide pin
46 face side
47 drive unit
48 drive motor, linear stepping motor
49 transmission element, spindle
51 elastically deformable intermediate element
52 mounting bolt
53 friction bearing
55 feed motion
61 second feed mechanism
63 external frame
64 hooks
67 drive unit
68 drive motor, linear stepping motor
69 gear, coupled gear
71 rod, spindle
72 coupling elements
73 oblong holes
74 joints
75 feed motion
80 headlamp housing
81 mounting frame
82 frame breakthrough
83 elastically deformable sleeve
84 breakthrough
85 elastically deformable plate
91-96 directions of light propagation
101-106 joints, ball joints

The invention claimed is:

1. A headlamp assembly comprising:
a headlamp housing;
a plurality of lamp units disposed within said headlamp housing, each of said plurality of lamp units includes at least one light module or at least one reflector module and a swivel lever;
a headlamp adjusting device including a linear stepper motor, said headlamp adjusting device disposed between said plurality of lamp units and said headlamp housing wherein a joint having three degrees of freedom to swivel mounts each of said plurality of lamp units individually in said headlamp housing, said headlamp adjusting device including first and second feed mechanisms, wherein said second feed mechanism guides said first feed mechanism and moves all of said plurality of lamp units in the same direction and in the same degree independent of location of each of said plurality of lamp units with respect to said headlamp housing, wherein the orientation of feed motion of said first feed mechanism and the orientation of feed motion of said second feed mechanism enclose an angle are oriented at least approximately normal to each other and not equal to an integral multiple of Pi; and
a plurality of mountings, one for each of said swivel levers such that said each of said mountings has exactly one degree of freedom of swivel.

2. A headlamp assembly as claimed in claim 1, characterized in that at least one of said swivel levers includes a linear displacement.

* * * * *